United States Patent [19]

Townsend

[11] Patent Number: 4,614,005
[45] Date of Patent: Sep. 30, 1986

[54] METHOD AND MEANS FOR LINKING ENCASED MEAT PRODUCTS

[75] Inventor: Ray T. Townsend, Des Moines, Iowa

[73] Assignee: Townsend Engineering Company, Des Moines, Iowa

[21] Appl. No.: 728,807

[22] Filed: Apr. 30, 1985

[51] Int. Cl.⁴ ............................................. A22C 11/10
[52] U.S. Cl. ............................................ 17/34; 17/49;
53/549; 198/626; 198/803.01; 198/805
[58] Field of Search ........................ 17/1 F, 24, 33, 34,
17/35, 49; 73/DIG. 11; 198/465.1, 626, 803.01,
805; 53/122, 504, 549, 550, 551, 552

[56] References Cited

U.S. PATENT DOCUMENTS

| | | | |
|---|---|---|---|
| 2,333,791 | 11/1943 | Hutchison | 73/DIG. 11 X |
| 3,115,668 | 12/1963 | Townsend | 17/33 |
| 3,694,853 | 10/1972 | Greider | 17/33 |
| 3,835,503 | 9/1974 | Townsend et al. | 17/35 |
| 3,902,587 | 9/1975 | Checcucci | 198/465.1 X |
| 3,934,701 | 1/1976 | Mooney et al. | 198/465.1 X |
| 3,971,101 | 7/1976 | Townsend et al. | 17/33 |
| 4,129,923 | 12/1978 | Hoegger | 17/33 |

*Primary Examiner*—R. L. Spruill
*Assistant Examiner*—Cynthia A. Collins
*Attorney, Agent, or Firm*—Zarley, McKee, Thomte, Voorhees & Sease

[57] ABSTRACT

A linking apparatus is provided for forming links in product-filled casing. The apparatus includes two rotatable pulley assemblies and two belt assemblies rotatably trained about the respective pulley assemblies. The belt assemblies are spaced apart from one another to define a linking station therebetween through which the casing passes. A plurality of pinching members are magnetically attracted into engagement with the belt assemblies for movement therewith. Each of the pinching members on the first belt assembly cooperates with a pinching member on the second belt assembly while passing through the linking station so as to engage and collapse the filled casing such that the casing can be twisted to form links. A control device is positioned in the path of the pinching members to hold and then release the members thereby controlling the spacing between pinching members within the linking station such that the length of links can be regulated. The method of linking product-filled casing includes rotatably directing the casing into the linking station between the pair of rotating belt assemblies wherein cooperating pairs of pinching members moving with the belt assemblies engage and collapse the casing therebetween, successively releasing the pairs of pinching members to pass through the linking station and engage the casing, and controlling the time interval between successive releases of pairs of pinching members to adjust the distance between the pinching members in the linking station, thereby varying the length of the links.

13 Claims, 12 Drawing Figures

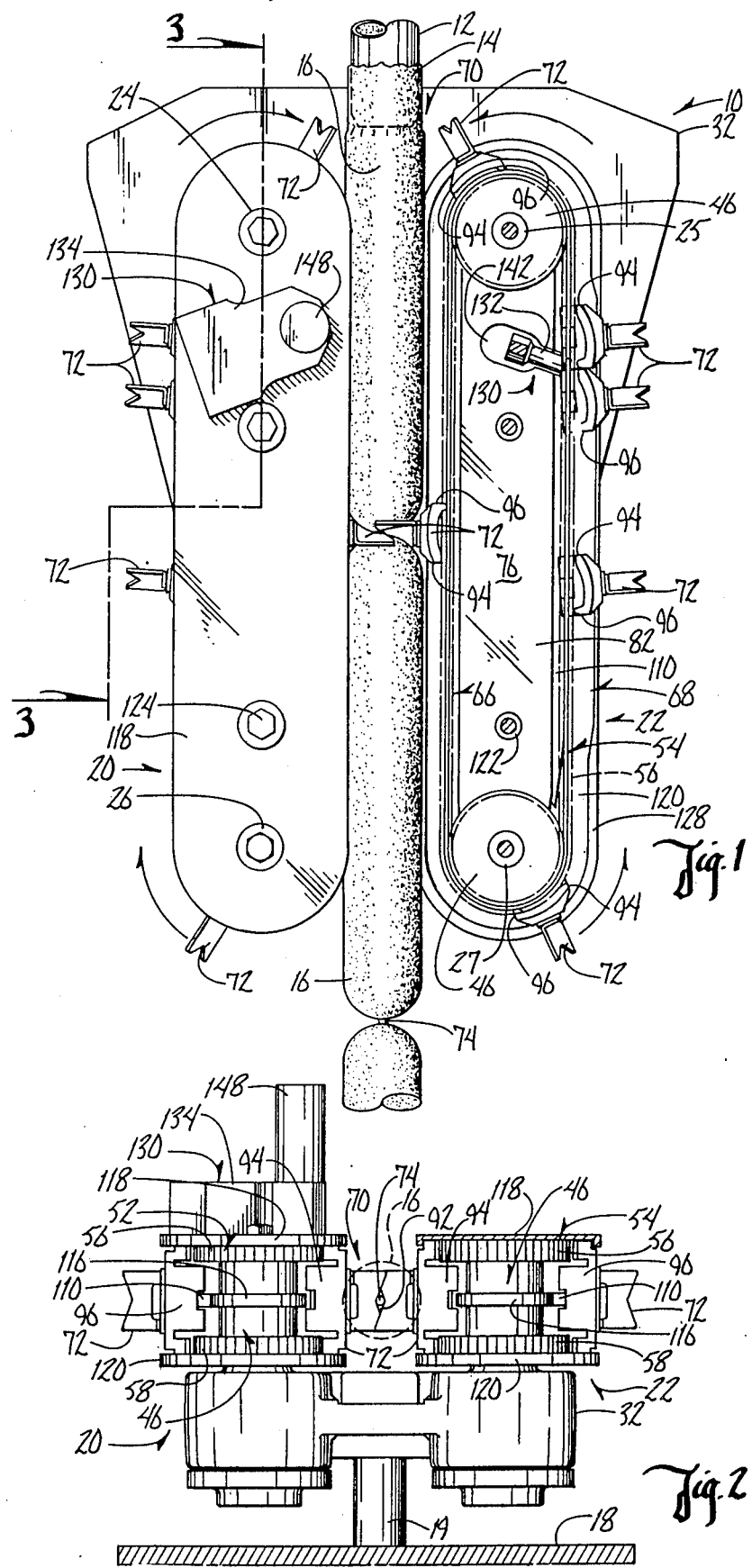

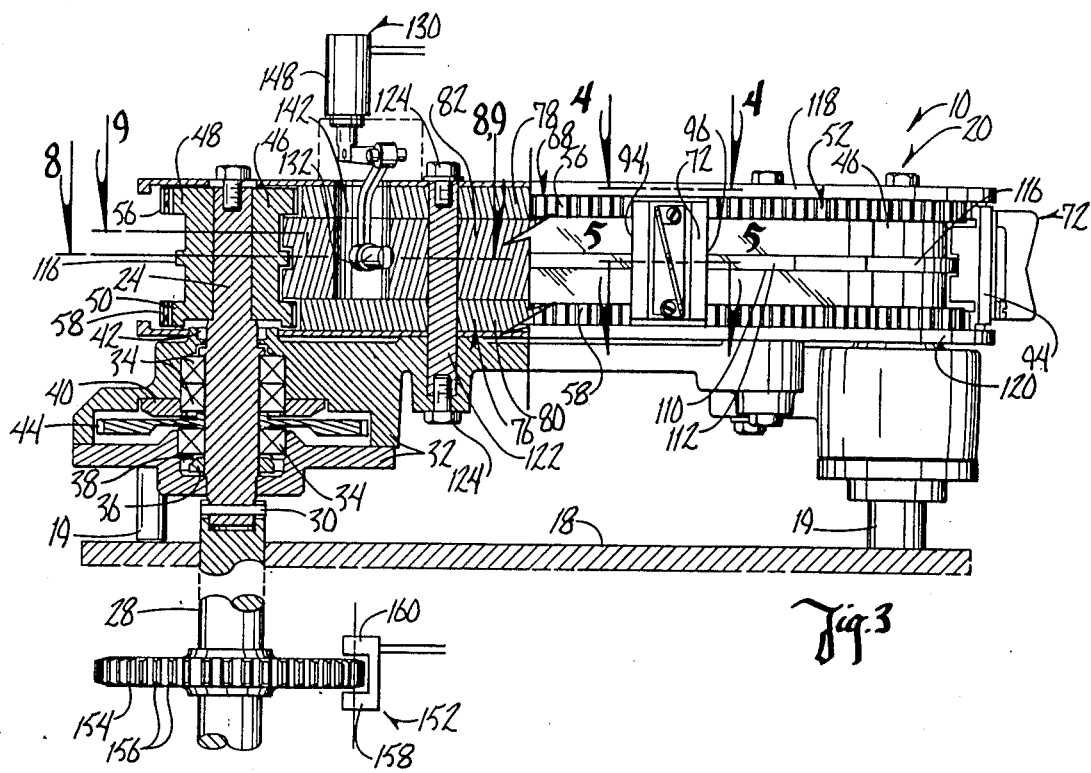
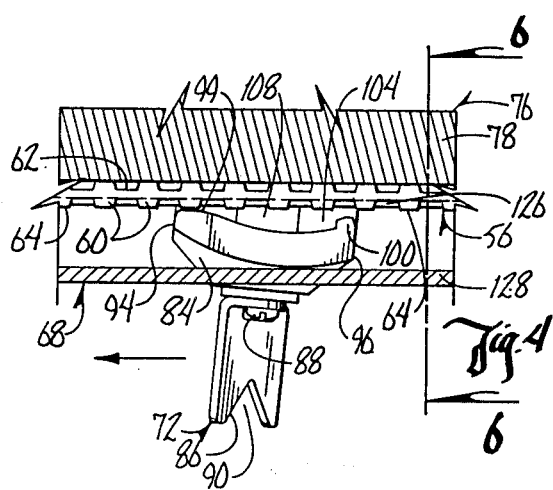
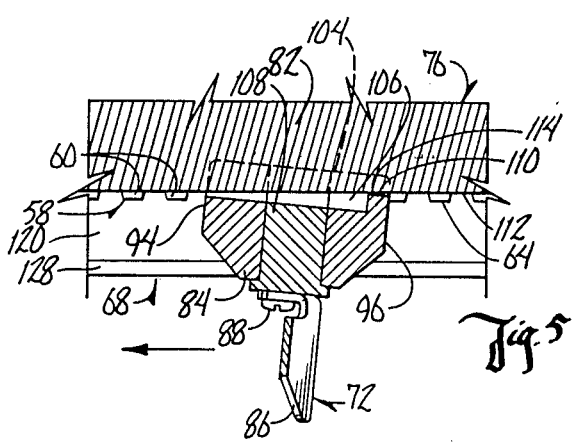
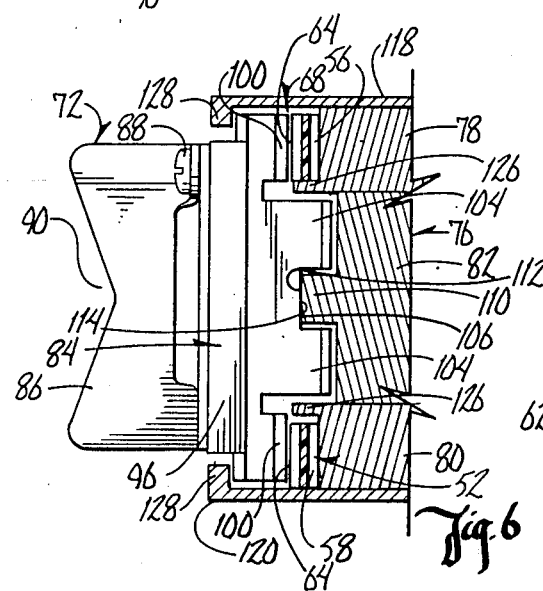
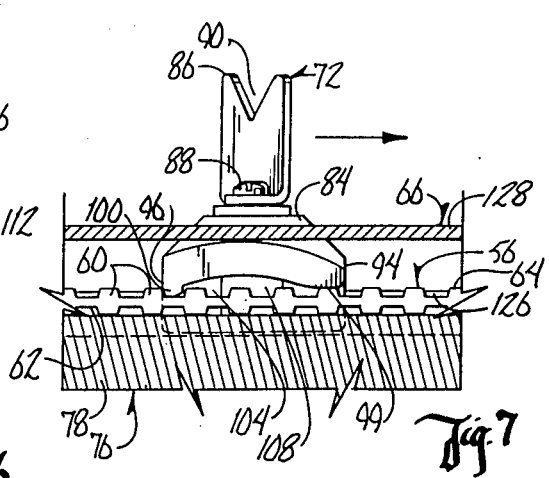

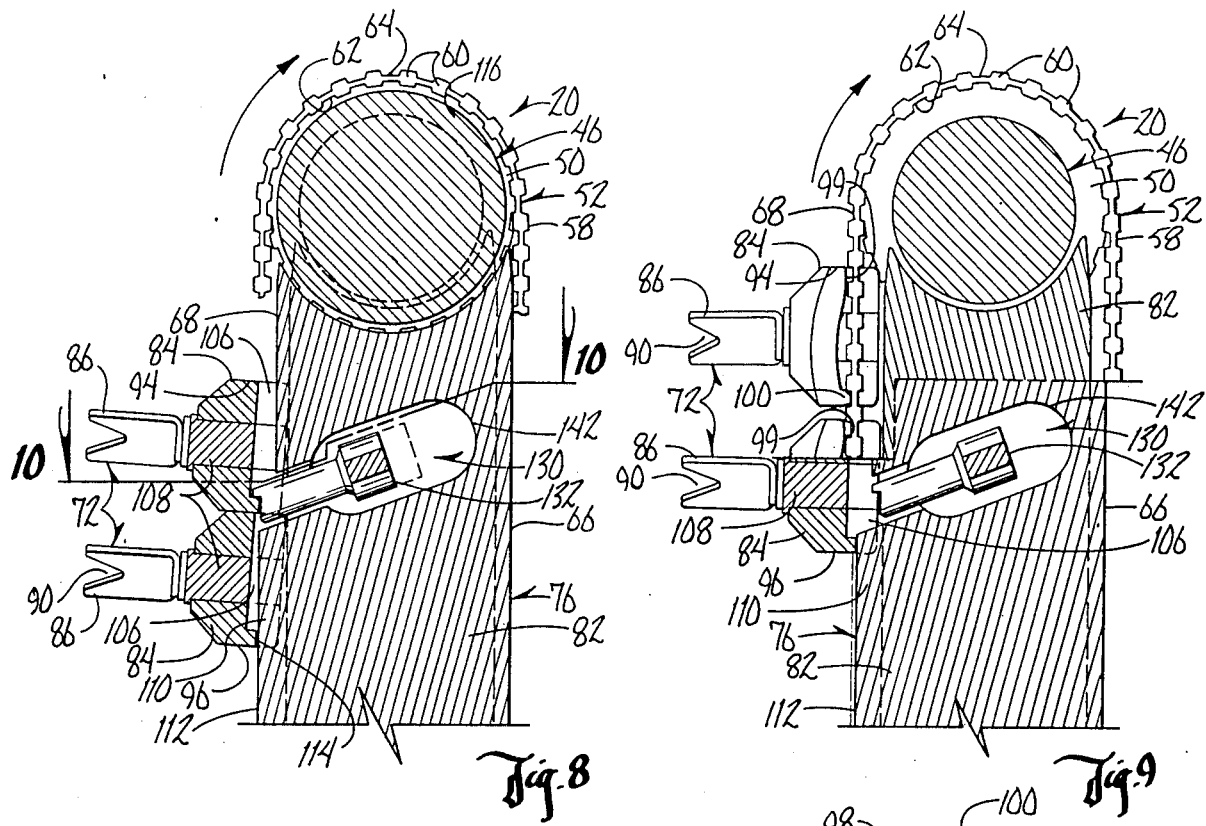
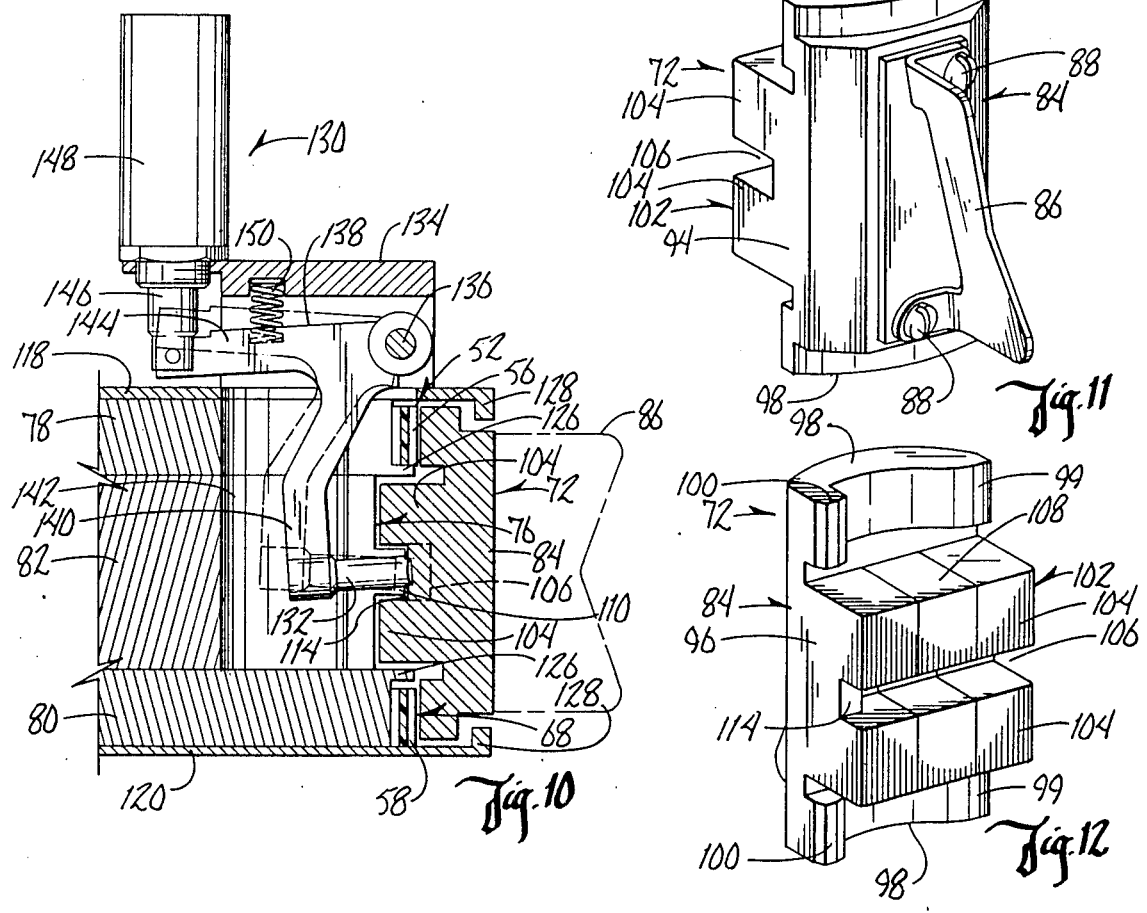

METHOD AND MEANS FOR LINKING ENCASED MEAT PRODUCTS

BACKGROUND OF THE INVENTION

Machines are common for stuffing meat into a casing and twisting the filled casing into links. For example, such machines are disclosed in U.S. Pat. No. 3,694,853 and in applicant's previous U.S. Pat. Nos. 3,115,668 and 3,835,503. Meat encasing machines generally include a stuffing station wherein the meat product is forced into the casing material and a linking station wherein the filled casing is crimped by pinching members and then twisted to form individual links. In the operation of a meat encasing machine, it is desirable to be able to vary the length of the link. Conventional machines typically change the length of the link by substituting one linking head for another which has fixed linking elements located at the proper increments on the linking chains. This method of altering the link length requires the machine to be stopped, thereby adding timely and costly delays to the process.

Therefore, a primary objective of the present invention is the provision of a method and means for linking encased meat products in which the length of the links can be altered without stopping and starting the machine.

A further objective of the present invention is the provision of a method and means for linking encased meat products which is operated continuously.

Another objective of the present invention is the provision of a method and means for linking encased meat products wherein the stuffing and linking stations are in a fixed position with respect to one another.

A further objective of the present invention is the provision of a method and means for linking encased meat products wherein the pinching members which form the links in the stuffed casing are slidably mounted with respect to one another.

A further objective of the present invention is the provision of magnetic means for maintaining the pinching members in their adjustable positions on the linking apparatus.

A further objective of the present invention is the provision of a variable timed control device on the linking apparatus for releasing the pinching members into the linking station.

Still another objective of the present invention is the provision of a linking apparatus for use on a meat encasing machine wherein the length of the links produced thereby can be easily adjusted.

SUMMARY OF THE INVENTION

The means for linking encased meat products of the present invention includes a linking apparatus capable of producing links of variable length without stopping the machine. The linking apparatus has two pairs of rotatable pulley assemblies about which first and second endless loop members or belts having opposite inner and outer track portions are trained. The belts are spaced apart from one another to define a linking station between the inner track portions through which the filled casing passes. Each belt carries a pinching member through the linking station such that the pair of pinching members passing therethrough cooperate to collapse the casing and reduce its cross-sectional size. The casing is rotated along its longitudinal length upstream from the cooperating pinching members so that the casing is twisted adjacent the collapsed portion thereof so as to form a link.

The pinching members have a magnetized portion therein which is attracted toward a metallic guide element mounted between the inner and outer track portions of each of the belts such that the pinching members are attracted toward the belts for engagement therewith. The pinching members also have a cam follower surface which engages a cam surface on the guide element adjacent the outer track portion of each of the belts so as to space the magnet of the pinching member apart from the metallic guide element and thus reduce the magnetic force therebetween. Thus, the pinching members are attracted by the guide element into locking engagement with the belts along the inner track portions thereof and such attraction is lessened along the outer tracks thereof such that the pinching members slidably engage the belts along the outer tracks thereof.

The linking apparatus also has a control device which regulates the passage of the pinching members into the linking station. The control device includes a pivotal catch adapted to releasably engage the pinching members on the outer track portion of the belts. A timing means is operatively connected to the control device for adjusting the time period elapsing between successive releases of pinching members for passage into the linking station such that the spacing between the cooperating pinching members passing through the linking station is variable. The timing means includes a sensor for sensing the rotation of one of the pulley assemblies and is adapted to actuate the control device to release the pinching members upon sensing a predetermined degree of rotation of one of the pulley assemblies.

BRIEF DESCRIPTION OF THE DRAWINGS

FIG. 1 is a top plan view of the linking apparatus of the present invention with the upper cap plate removed from one of the pulley assemblies.

FIG. 2 is an end elevational view of the linking apparatus.

FIG. 3 is a sectional side elevational view of the apparatus taken along lines 3—3 of FIG. 1.

FIG. 4 is a partial sectional view taken along lines 4—4 of FIG. 3 showing the position of a pinching member on the outer track portion of the endless loop belt.

FIG. 5 is a partial sectional view taken along lines 5—5 of FIG. 3.

FIG. 6 is a partial sectional view taken along line 6—6 of FIG. 4.

FIG. 7 is a view similar to FIG. 4 showing a pinching member in position on the inner track portion of the endless loop belt.

FIG. 8 is a partial sectional view taken along lines 8—8 of FIG. 3 showing the control catch in a closed position.

FIG. 9 is a view taken along lines 9—9 of FIG. 3 showing the control catch in an open position.

FIG. 10 is a view taken along lines 10—10 of FIG. 8 showing the closed position of the control means in solid lines and the open position of the control means in dotted lines.

FIGS. 11 and 12 are perspective views of a pinching member.

DETAILED DECRIPTION OF THE PREFERRED EMBODIMENT

The linking apparatus of the present invention is generally designated in the Figures by the reference numeral 10. Linking apparatus 10 is positioned adjacent a conventional stuffing machine (not shown) having a stuffing tube 12 upon which casing material 14 is shirred. The stuffing machine also has rotation means (not shown) for rotating the filled casing 16 about its longitudinal axis.

Linking apparatus 10 includes a base 18 having legs 19 which support two rotatable pulley assemblies 20 and 22. Pulley assemblies 20 and 22 each include a pulley drive shaft 24 and 25, respectively, and a pulley idler shaft 26 and 27, respectively. Drive shaft 24 of pulley assembly 20 is rotatably driven by a power shaft 28 connected thereto by a pin 30 and operatively connected to a power source (not shown). Bearing plates 32 support drive shaft 24 and house a plurality of bearings 34, lock nut 36, lock washer 38, bearing cap 40, and seal 42. With the exception of any direct connection to power shaft 28, drive shaft 25 of pulley assembly 22 and idler shafts 26 and 27 have similar structure permitting rotation of the shaft. It is understood that such structure for providing accurate rotation of the pulley shafts is well known and is not a part of the present invention.

A gear 44 is connected to drive shaft 24 of pulley assembly 20 and meshes with a similar gear (not shown) fixed to drive shaft 25 of pulley assembly 22 such that rotation of drive shaft 24 by power shaft 28 causes drive shaft 25 to rotate about its longtudinal axis at the same speed, but in the opposite direction as drive shaft 24.

Fixed to each drive shaft 24 and 25 and each idler shaft 26 and 27 is a pulley member 46 having upper and lower ends 48 and 50, respectively. A first endless loop belt assembly 52 is trained about pulley members 46 of pulley assembly 20 and a second endless loop belt assembly 54 is trained about pulley members 46 of pulley assembly 22. Each belt assembly includes an upper belt 56 and a vertically spaced lower belt 58, both of which have notches 60 on the inner surface 62 and outer surface 64 thereof. Upper end 48 and lower end 50 of each pulley member 46 are notched to matingly engage the notches 60 on inner surface 62 of each belt 56, 58. Thus, rotation of drive shaft 24 by power shaft 28 causes idler shaft 26 to rotate through the interaction of pulley members 46 and first belt assembly 52, while simultaneously imparting rotation to drive shaft 25 through gear 44 such that idler shaft 27 is rotated by the interaction of pulley members 46 and second belt assembly 54. It is understood that the pulley members and belts of pulley assembly 20 rotate in the opposite direction as those of pulley assembly 22.

Each belt assembly 52, 54 includes an inner track portion 66 and a horizontally spaced outer track portion 68. Belt assemblies 52 and 54 are spaced apart from one another so as to define a linking station 70 between the respective inner track portions 66 through which filled casing 16 passes.

Each belt assembly 52, 54 carries a plurality of pinching members 72 for movement therewith. Each pinching member carried on belt assembly 52 cooperates with a pinching member on belt assembly 54 while passing through linking stations 70 so as to engage and collapse filled casing 16 therebetween and reduce its cross-sectional size such that a twisted section 74 is formed in the casing to provide joined links of stuffed casing, as best seen in FIG. 2.

Pulley assemblies 20 and 22 are identical, with the exception of the drive train of drive shafts 24 and 25. Therefore, the remaining description of the present invention will be with respect to pulley assembly 20 as shown in FIG. 3 with the understanding that pulley assembly 22 is a mirror image of pulley assembly 20.

As seen in FIGS. 3, 8 and 9, a guide element 76 extends between pulley members 46 on drive shaft 24 and idler shaft 26 and substantially spans the space between inner track portion 66 and outer track portion 68 of belt assembly 52. Guide element 76 includes upper and lower support surfaces 78 and 80, adjacent inner and outer track portions 66 and 68, respectively, for limiting the horizontal movement of the inner and outer track portions of belt assembly 52 towards one another. Guide element 76 also has a middle support surface 82 adjacent the inner and outer track portions of belt assembly 52 whose function will be described hereinafter.

Each pinching member 72 includes a base 84 and a crimping lug 86 secured to base 84 in any convenient manner, such as by screws 88. Lug 86 is angularly disposed with respect to base 84 and includes a V-shaped notch 90 which forms a pinching surface thereon. As pinching members 72 on each belt assembly 52, 54 enter linking station 70, notches 90 thereon align with one another to engage and collapse filled casing 16. A small opening 92 is maintained between notches 90 through which the collapsed casing extends. The rotation of filled casing 16 about its longitudinal axis causes the casing to twist at the collapsed portion thereof so as to form twisted casing section 74.

Base 84 of each pinching member 72 has a leading edge 94, a trailing edge 96 and opposite ends 98. Leading edge 94 adjacent opposite ends 98 of pinching member base 84 has a substantially flat portion 99 for frictionally engaging notches 60 of upper belt 56 and lower belt 58 for suport thereon, as seen in FIG. 7. Trailing edge 96 includes a projection 100 thereon at each end 98 of base 84. Projections 100 are adapted to engage upper belt 56 and lower belt 58 and be received in the recessed portion thereof between adjacent notches 60, as seen in FIG. 7.

The bottom side of base 84 of each pinching member 72 also includes a U-shaped portion 102 extending from leading edge 94 to trailing edge 96 and having opposite legs 104 and a recessed area 106 therebetween. U-shaped portion 102 also has a central magnetized area 108 which may also be U-shaped. This magnetized area 108 pulls pinching member 72 toward the metallic middle support surface 82 of guide element 76 such that the pinching members are maintained in position on belt assemblies 52 and 54.

As seen in the drawings, middle support surface 82 of guide element 76 includes a projection 110 which is received within recessed area 106 on the bottom of base 84 so as to limit the vertical movement of pinching member 72 upon belt assemblies 52 and 54. Projection 110 has a greater dimension adjacent outer track portion 68 of the belt assemblies than adjacent the inner track portions thereof. Along the outer track portion 68 of the belt assemblies, a cam surface 112 is provided on projection 110 which is adapted to be engaged by a raised cam follower surface 114 in recessed area 106 on the bottom of base 84 adjacent trailing edge 96 thereof. Thus, along outer track portion 68 of each belt assembly 52, 54, cam follower surface 114 engages the raised cam surface 112 of middle support surface 82 of guide element 76. Such engagement spaces magnetized area 108 of base 84 of pinching member 72 apart from the metallic middle support surface 82 of the guide element, thereby reducing the force of magnetic attraction therebetween. Also, the engagement of cam follower surface 114 with cam surface 112 raises projection 100 on base 84 of pinching member 72 out of the recessed area between adjacent notches 60 on upper and lower belts 56, 58, respectively, as best seen in FIGS. 4 and 6.

Thus, as pinching members 72 travel along inner track portion 66 of belt assemblies 52 and 54, the magnetic attraction between magnetized area 108 (FIG. 12) of pinching member 72 and the metallic guide element 76 attracts pinching member 72 toward upper and lower belts 56, 58 such that projection 100 of pinching member 72 is matingly received within the space between adjacent notches 60 on the belts thereby lockingly engaging pinching member 72 upon the belts for travel therewith. Also, as pinching members 72 travel along outer track portion 68 of belt assemblies 52, 54, the engagement of cam follower surface 114 of pinching member 72 upon cam surface 112 of guide element 76 raises projection 100 on base 84 out of locking engagement with belts 56 and 58 and thereby spaces magnetized area 108 apart from metallic guide element 76 to reduce the magnetic forces therebetween. The frictional engagement between notches 60 of belts 56, 58 and flat portion 99 of base 84 of pinching members 72 is sufficient to carry the pinching members along the outer track portion 68 of belt assemblies 52, 54.

As seen in the drawings, pulley members 46 also have a raised portion 116 extending about the center thereof for guidance of pinching members around each pulley member. Furthermore, the pulley members may be made of metal such that the magnetized area 108 of pinching members 72 are attracted thereto.

Each pulley assembly 20 and 22 also includes an upper cap plate 118 and a lower cap plate 120 whicn cover the top and bottom sides of the pulley assemblies. Cap plates 118 and 120 are held in place by any convenient manner, such as posts 122 and bolts 124. Cap plates 118 and 120 cover upper belts 56 and lower belts 58, respectively, and cooperate with a flange 126 on upper and lower support surfaces 78 and 80, respectively, of guide element 76 to provide a track within which the belts travel with limited vertical movement therebetween, as best seen in FIG. 6. Also. upper cap plate 118 and lower cap plate 120 each have opposing flanges 128 extending around the perimeter thereof which facilitates the alignment of pinching members 72 upon upper belt 56 and lower belt 58. It is noted that the thickness of flange 128 on each cap plate is reduced adjacent outer rack portion 68 to accommodate the movement of pinching members 72 away from the belts in response to engagement of cam follower surface 114 upon cam surface 112 of guide element 76, as seen in FIG. 1.

Linking apparatus 10 also includes a control means 130 for controlling the release of pinching members 72 from outer track portion 68 into inner track portion 66 for travel through linking station 70 such that the length of the links of stuffed casing formed by linking apparatus 10 can be varied. There are identical contronl means 130 for each pulley assembly 20, 22, therefore only one will be described.

Basically control means 130 includes a latch or catch 132 positioned in the path of the pinching members 72 on the respective belt assemblies 52 and 54. Catch 132 is adapted to engage one pinching member on the outer track portion 68 of each belt assembly to prevent movement of the engaged pinching member with the belt, and then release the engaged pinching member for movement with the belt into the linking station 70. Since only the flat portion 99 of base 84 of pinching member 72 engages belts 56 and 58 during travel along the outer track portion of the belt assemblies, and projections 100 on the pinching member base are not received in the recessed area between notches 60 of the belts due to engagement of cam follower surface 114 of pinching member 72 with cam surface 112 of guide element 76, belts 56 and 58 are free to slide beneath pinching member 72 when the pinching member is engaged by catch 132.

More particularly, control means 130 includes a support frame 134 mounted upon upper cap plate 118. A pivot pin 136 is supported by frame 134 and has a linkage arm 138 pivotally mounted thereon. Linkage arm 138 has a lower end 140 extending into an opening 142 in guide element 76 and to which catch 132 is attached. The upper end 144 of linkage arm 138 is secured to the actuating leg 146 of a solenoid 148. When solenoid 148 is actuated, leg 146 is retracted therein to pivot linkage arm 138 about pin 136 and thereby move catch 132 from the closed position wherein pinching member 72 is engaged and retained thereby, to the open position wherein the pinching member is free to travel with tne rotating belt assembly 52 or 54. A spring 150 has opposite ends attached to support frame 134 and upper end 144 of linkage arm 138, respectively, to urge catch 132 back into the closed position after release of one pinching member 72, such that the next adjacent pinching member is engaged and retained by control means 130.

Preferably, catch 132 extends into recessed area 106 in base 84 of pinching member 72 and engages the projecting cam follower surface 114 thereon when control means 130 is in the closed position. It is understood that latch 132 could engage any other portion of pinching member 72 to prevent the pinching member from moving into the linking station until released by control means 130.

A variable timing means 152 is operatively connected to control means 130 to actuate solenoid valve 148 such that the time between successive openings of control means 130 can be regulated. One example of a suitable timing means 152 is illustrated in FIG. 3 wherein a gear 154 having a plurality of teeth 156 is secured to power snaft 28 for rotation therewith. A light source 158 is positioned on one side of gear 154 adjacent teeth 156 thereof and a photocell 160 is positioned on the opposite side of gear 154 in alignment with light source 158. Photocell 160 is connected to a conventional counting device such as a computer (not shown) counts the number of times thar photocell 160 receives light from light source 158 as the light passes between successive teeth 156 of rotating gear 154. The counting device is operatively connected to solenoid 148 such that after a predetermined number of teeth have passed photocell 160, solenoid valve 148 is actuated to move catch 132, which is normally closed, to an open position so as to release a pair of cooperating pinching members 72 for movement into linking station 70. Thus, as pulley members 46 rotate a predetermined number of degrees as counted by the number of teeth passing photocell 160, control means 130 is actuated such that a twisted section 74 of illed casing 16 can be formed.

Timing means 152 can be altered without stopping linking apparatus 10 simply by changing the number of teeth or degree of rotation to be sensed by the counting device before solenoid 148 is actuated. Thus, the length of the links formed by the linking apparatus can be varied while the apparatus continues to operate.

In operation, pulley members 46 and belt assemblies 52 and 54 of pulley assemblies 20 and 22, respectively, are rotated at the same speed in opposite directions by actuation of power shaft 28. Pinching members 72 are pulled into engagement with belt assemblies 52 and 54 by the magnetic attracting force between magnetized area 108 of the pinching member and metallic guide elements 76 adjacent the belt assemblies, such that pinching members 72 move with the rotating belt assemblies. On inner track portion 66 of the belt assemblies, flat portion 99 of base 84 of pinching member 72 engages notches 60 of belts 56 and 58 and projections 100 on the base of the pinching members are received in the recessed area between adjacent notches on the belts such that the pinching members are lockingly engaged on the belts for travel therewith. As the pinching members travel to the outer track portion 68 of belt assemblies 52 and 54, cam follower surface 114 of base 84 of pinching member 72 engages raised cam surface 112 of guide element 76 to move projections 100 out of engagement with belts 56 and 58 and to space magnetized area 108 of the pinching members apart from metallic guide element 76 so as to reduce the force of attraction therebetween.

As pinching members continue travel along outer track portion 68 of belt assemblies 52 and 54, catches 132 of control means 130 successively engages one pinching member 72 on each belt assembly so as to hold the pinching member against movement with the belt assembly which continues to rotate about pulley members 46. Timing means 152 senses the degree of rotation of pulley members 46 and periodically actuates solenoids 148 so as to move catches 132 from a closed position wherein the pair of pinching members 72 are engaged, to an open position wherein the pair of pinching members 72 are released for travel with belt assemblies 52 and 54 into linking station 70. It is understood that the engagement of a pinching member by catcn 132 of control means will cause a back up of pinching members along outer track portion 68, as best seen in FIG. 1.

As the pair of released pinching members 72 enter linking station 70, they cooperate with one another such that V-shaped notches 90 thereof align with one another to engage and collapse filled casing 16. As the casing is rotated along its longitudinal axis by stuffing machine, the casing twists at the collapsed portion thereof to form one end of a link. By adjusting timing means 152, the time elapsing between release by control means 130 of pair of pinching members 72 for travel into linking station 70 can be varied such that the length of the links formed in linking station can be altered.

Thus, at least all of the stated objectives are accomplished by the method and means for linking enclosed meat products of the present invention.

What is claimed is:

1. Linking apparatus for use with a product encasing machine, said machine being adapted to expel an elongaged casing filled with plastic product and being adapted to rotate said casing about the longitudinal axis thereof; said linking apparatus forming elongated link of encased produced and comprising:

a base having a forward end and a rearward end;

first and second sets of pulley means rotatably mounted on said base;

means for rotating said pulley means;

first and second belt means trained around said first and second sets of pulley means, respectively, for rotation thereabout, each of said first and second belt means being an endless loop defining an inner track portion and an outer track portion, and said first and second belt means being spaced apart so as to define a linking station between said inner track portions through which said casing passes;

a plurality of pinching members slidably enaging said first and second belt means for movement therewith;

means for maintaining said pinching members in engagement with said first and second belt means; and first and second control means for engaging and releasing successive pinching members on each of said first and second belt means, respectively, said pinching members being prevented from moving with said belt means when engaged by said control means and said pinching members moving with said belt means when released by said control means;

said first and second control means engaging said pinching members prior to moving into said linking station and releasing said pinching members for movement into said linking station at predetermined time intervals such that each of said pinching members on said first belt means cooperates with one of said pinching members on said second belt means while passing through said linking station so as to engage and collapse the casing therebetween and reduce the cross-sectional size thereof, said pinching members on each of said first and second belt means being spaced apart from one another while passing through said linking station such that successive pairs of cooperating pinching members form opposite ends of an elongated link;

variable timing means operatively connected to said control means for regulating the time interval between release of successive pinching members and thereby controlling the spacing between cooperating pairs of pinching members within said linking station such that the length of said links is selectively adjustable.

2. The apparatus of claim 1 wherein said means for maintaining said pinching members in engagement with said belt means includes magnetic means for attracting said pinching members toward said belt means.

3. The apparatus of claim 2 wherein said magnetic means includes a magnet on each of said pinching members and a metallic guide element mounted on said base between said inner and outer track portions of each of said belt means.

4. The apparatus of claim 3 wherein said pulley means each have a metallic portion for attracting said pinching members toward said belt means as said belt means and pinching members travel around said pulley means.

5. The apparatus of claim 2 wherein said guide element includes a cam surface adjacent said outer track portion of said belt means and each of said pinching members have a cam follower surface for engaging said cam surface of said guide element so as to space said pinching member apart from said guide element whereby the magnetic attraction between said pinching member and said belt means is lessened along said outer track portion of said belt means.

6. The apparatus of claim 1 wherein each of said belt means includes a pair of spaced apart endless loops trained around the respective set of pulley means, each loop having notches along the length thereof, and wherein said pinching members each have a projection adapted to engage one of said notches of said loops for locking engagement therewith as said pinching members pass through said linking station.

7. The apparatus of claim 6 further including a cam surface adjacent said outer track portion of each belt means and said pinching members each having a cam follower surface for engaging said cam surface so as to move said projection of said pinching member out of engagement with said notch of said belt means and thereby terminating said locking engagement between said pinching member and said belt means along said outer track portion thereof.

8. The apparatus of claim 1 wherein each of said control means moves between a closed position and an open position, said control means engaging said pinching members when in said closed position thereby preventing entry of said pinching members into said linking station and said control means releasing said pinching members when in said open position thereby allowing entry of said pinching members into said linking station.

9. The apparatus of claim 8 wherein each of said control means releases one cooperating pair of said pinching members each time said control means moves from said closed position to said open position.

10. The apparatus of claim 8 wherein said timing means includes a sensor for sensing the rotation of one of said pulley means and adapted to actuate said successive movements of each of said control means to said open position upon sensing a predetermined degree of rotation of said one of said pulley means.

11. The apparatus of claim 8 wherein each of said control means includes a pivotal catch adapted to releasably engage said pinching member, and means for pivoting said catch between said open and closed positions.

12. The apparatus of claim 11 wherein said means for pivoting said catch includes a solenoid operatively connected to said timing means for moving said catch from said closed position to said open position and a spring means for moving said catch from said open position to said closed position.

13. The method of linking meat products encased in an elongated cylindrical casing, comprising:
  rotatably directing an elongated cylindrical casing filled
  with a meat emulsion into an elongated linking station between a pair of spaced apart rotatable belt means having pinching members engaging said belt means for movement therewith;
  successively releasing pairs of said pinching members to pass through said linking station to engage and collapse said casing to create a reduced cross-sectional portion therein, said release being at predetermined time intervals such that successive pairs of pinching members are spaced apart while passing through said linking station so as to form opposite ends of an elongated link; and
  controlling the time interval between the release of successive pairs of pinching members thereby adjusting the spacing between the pairs of pinching members passing through said linking station so as to vary the length of said links.

* * * * *